United States Patent
Hanko et al.

(10) Patent No.: US 6,694,379 B1
(45) Date of Patent: Feb. 17, 2004

(54) METHOD AND APPARATUS FOR PROVIDING DISTRIBUTED CLIP-LIST MANAGEMENT

(75) Inventors: James G. Hanko, Redwood City, CA (US); Alan T. Ruberg, Foster City, CA (US); J. Duane Northcutt, Menlo Park, CA (US); Gerard A. Wall, San Jose, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/289,802

(22) Filed: Apr. 9, 1999

(51) Int. Cl.$^7$ ............................................... G06F 9/54
(52) U.S. Cl. ........................................ 709/329; 345/545
(58) Field of Search ................................. 345/606–689, 345/700–867, 545–547; 709/310–320, 329

(56) References Cited

U.S. PATENT DOCUMENTS

| | | | | |
|---|---|---|---|---|
| 4,994,912 A | * | 2/1991 | Lumelsky et al. | 348/481 |
| 5,220,312 A | * | 6/1993 | Lumelsky et al. | 345/563 |
| 5,442,749 A | | 8/1995 | Northcutt et al. | 709/219 |
| 5,861,881 A | * | 1/1999 | Freeman et al. | 715/500.1 |
| 5,986,676 A | * | 11/1999 | Dwin et al. | 345/544 |

OTHER PUBLICATIONS

Finnegan, James, "Developing a Client/Server Multimedia App Using RPCs and Video for Windows 1.1", Microsoft Systems Developers Journal, Sep. 1995, pp(36).*

Diehl et al., "Video for Free", BYTE, pp(8), Feb. 1995.*

* cited by examiner

Primary Examiner—St. John Courtenay, III
(74) Attorney, Agent, or Firm—O'Melveny & Myers LLP

(57) ABSTRACT

A method and apparatus for providing distributed clip-list management. In an embodiment, an application maintains a local clip-list that identifies those portions of a remote frame buffer that are unambiguously associated with the given application, as well as those portions of the remote frame buffer which are disputed between the given application and one or more other applications. Applications may enforce a dispute policy with respect to writing image data to disputed regions of the frame buffer. Applications are able to write to the frame buffer asynchronously, without the use of a frame buffer lock. A clip manager maintains a global clip-list, and responds to messages from the applications by updating the global clip-list and informing those other applications of relevant changes to their own respective local clip-lists. The portions of an application's clip-list that have been previously claimed by other applications and which have not been acknowledged as lost by the other applications are referred to as disputed regions. Each application is kept informed about its current clip-list and any disputed regions within its current clip-list. The clip manager may be implemented as part of the window manager, or as a separate process. A policing process may be implemented at or in line with the frame buffer to ensure that an application does not write to portions of the frame buffer that have been granted to another application. The operations of the policing process are coordinated by the clip manager.

29 Claims, 12 Drawing Sheets

METHOD AND APPARATUS FOR PROVIDING DISTRIBUTED CLIP-LIST MANAGEMENT

BACKGROUND OF THE INVENTION

1. Field of the Invention

This invention relates to the field of digital video, and, more specifically, to digital video applications in a network environment.

Sun, Sun Microsystems, the Sun logo, Java and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

Computers and computer networks are used to exchange information in many fields such as media, commerce, and telecommunications, for example. One form of information that is commonly exchanged is video data (or image data), i.e., data representing a digitized image or sequence of images. A video conferencing feed is an example of telecommunication information which includes video data. Other examples of video data include video streams or files associated with scanned images, digitized television performances, and animation sequences, or portions thereof, as well as other forms of visual information that are displayed on a display device. It is also possible to synthesize video information by artificially rendering video data from two or three-dimensional computer models.

The exchange of information between computers on a network occurs between a "transmitter" and a "receiver." In video applications, the information contains video data, and the services provided by the transmitter are associated with the processing and transmission of the video data. Typically, one or more applications are located at the receiver to interface with a display unit's local frame buffer. A mutual exclusion lock is implemented to ensure that only one application writes to the frame buffer at a time. A local clip-list, managed by a window manager, is used to identify which portions of the frame buffer correspond to which application.

Unfortunately, the use of locking mechanisms and a local clip-list are inefficient in a distributed, asynchronous networking environment where video applications and window managers may exist on servers (or transmitters) remote from a receiver and its associated frame buffer. To provide a better understanding of computer video technology and its associated drawbacks, a general description of computer graphics and video technology is given below.

General Video Technology

In digital video technology, a display is comprised of a two dimensional array of picture elements, or "pixels," which form a viewing plane. Each pixel has associated visual characteristics that determine how a pixel appears to a viewer. These visual characteristics may be limited to the perceived brightness, or "luminance," for monochrome displays, or the visual characteristics may include color, or "chrominance," information. Video data is commonly provided as a set of data values mapped to an array of pixels. The set of data values specify the visual characteristics for those pixels that result in the display of a desired image. A variety of color models exist for representing the visual characteristics of a pixel as one or more data values.

RGB color is a commonly used color model for display systems. RGB color is based on a "color model" system. A color model allows convenient specification of colors within a color range, such as the RGB (red, green, blue) primary colors. A color model is a specification of a three-dimensional color coordinate system and a three-dimensional subspace or "color space" in the coordinate system within which each displayable color is represented by a point in space. Typically, computer and graphic display systems are three-phosphor systems with a red, green and blue phosphor at each pixel location. The intensities of the red, green and blue phosphors are varied so that the combination of the three primary colors results in a desired output color.

An example of a system for displaying RGB color is illustrated in FIG. 1. A frame buffer 140, also known as a video RAM, or VRAM, is used to store color information for each pixel on a video display, such as CRT display 160. DRAM can also be used as buffer 140. VRAM 140 maps one memory location for each pixel location on the display 160. For example, pixel 190 at screen location $X_0Y_0$ corresponds to memory location 150 in VRAM 140. The number of bits stored at each memory location for each display pixel varies depending on the amount of color resolution required. For example, for word processing applications or display of text, two intensity values are acceptable so that only a single bit need be stored at each memory location (since the screen pixel is either "on" or "off"). For color images, however, a plurality of intensities must be definable. For certain high end color graphics applications, it has been found that twenty-four bits per pixel produces acceptable images.

Consider, for example, that in the system of FIG. 1, twenty-four bits are stored for each display pixel. At memory location 150, there are then eight bits each for the red, green and blue components of the display pixel. The eight most significant bits of the VRAM memory location could be used to represent the red value, the next eight bits represent the green value and the eight least significant bits represent the blue value. Thus, 256 shades each of red, green and blue can be defined in a twenty-four bit per pixel system. When displaying the pixel at X0, Y0, the bit values at memory location 150 are provided to video driver 170. The bits corresponding to the red (R) component are provided to the red driver, the bits representing the green (G) component are provided to the green driver, and the bits representing the blue (B) component are provided to the blue driver. These drivers activate the red, green and blue phosphors at the pixel location 190. The bit values for each color, red, green and blue, determine the intensity of that color in the display pixel. By varying the intensities of the red, green and blue components, different colors may be produced at that pixel location.

Color information may be represented by color models other than RGB. One such color model is known as the YUV (or Y'CbCr as specified in ITU.BT-601) color space which is used in the commercial color TV broadcasting system. The YUV color space is a recoding of the RGB color space, and can be mapped into the RGB color cube. The RGB to YUV conversion that performs the mapping may be defined, for example, by the following matrix equation:

$$\begin{bmatrix} Y' \\ U' \\ V' \end{bmatrix} = \begin{bmatrix} Y' \\ Cb \\ Cr \end{bmatrix} = \begin{bmatrix} 0.299 & 0.587 & 0.114 \\ -0.169 & -0.331 & 0.500 \\ 0.500 & -0.419 & -0.081 \end{bmatrix} \cdot \begin{bmatrix} R' \\ G' \\ B' \end{bmatrix}$$

The inverse of the matrix is used for the reverse conversion. The Y axis of the YUV color model represents the luminance of the display pixel, and matches the luminosity response curve for the human eye. U and V are chrominance values. In a monochrome receiver, only the Y value is used. In a color receiver, all three axes are used to provide display information.

In operation, an image may be recorded with a color camera, which may be an RGB system, and converted to YUV for transmission. At the receiver, the YUV information is then retransformed into RGB information to drive the color display.

Many other color models are also used to represent video data. For example, CMY (cyan, magenta, yellow) is a color model based on the complements of the RGB components. There are also a variety of color models, similar to YUV, which specify a luminance value and multiple chrominance values, such as the YIQ color model. Each color model has its own color transformation for converting to a common displayable video format such as RGB. Most transformations may be defined with a transform matrix similar to that of the YIQ color space.

Image data is often provided as output of an application executing on a computer system. More than one such application may output image data to the same display device. For example, in a windowing display environment, a window manager may be implemented to manage the display of data from multiple applications into multiple windows on the display device.

FIG. 2 is a block diagram of a video display system comprising multiple applications (200 and 201) writing to a single frame buffer (140) under control of a window manager (202). As illustrated, applications 200 and 201 are coupled to transmission medium 203, as are window manager 202 and frame buffer 140. Frame buffer 140 drives display 160 as described with respect to FIG. 1. Transmission medium 203 may be a high-bandwidth bus in a personal computer system. In a network environment, such as one implementing thin clients or terminals, transmission medium 203 may comprise a lower bandwidth network that is shared with other applications executing on one or more servers, as well as frame buffers supporting other client displays.

In FIG. 2, window manager 202 manages the way in which video output of applications 200 and 201 (and the video output of any other application operating under the given windowing environment) is displayed on display 160. Applications 200 and 201 register with window manager 203 when those applications have video output to be displayed. In accordance with one frame buffer access scheme, when an application wishes to write to the frame buffer 140, the application may transmit a write request to window manager 202. Window manager 202 then writes the specified image data to the frame buffer on behalf of the application. However, in a direct graphics access (DGA) scheme, the applications may write directly to the frame buffer, bypassing window manager 202.

A mechanism by which window manager 202 manages video output is via a clip-list 204 associated with frame buffer 140. Clip-list 204 provides information about which portions of frame buffer 140, and hence the display 160, may be written by a given application. Clip-list 204 may, for example, take the form of a bit mask or a list of rectangles that defines those portions of an application display window that are not overlapped by another window and are, therefore, visible to the user. When a user alters a window on the display (e.g., by closing, opening, dragging or resizing the window, or reordering layered windows), window manager 202 modifies clip-list 204 accordingly. When an application attempts to write to frame buffer 140, the application determines that clip-list 204 has changed, and modifies its frame buffer writing operations appropriately.

In the prior art, frame buffer 140 typically has an associated lock 205 that must be obtained by an application before access to the buffer is granted. For example, if application 200 wishes to draw to display 160 by writing to frame buffer 140, application 200 must first obtain frame buffer lock 205. If another application currently has the lock, application 200 must wait until lock 205 is released by that other application. In similar fashion, window manager 202 must obtain frame buffer lock 205 to access the associated clip-list 204.

FIG. 3 is a block diagram illustrating an example of a display image 300 that could be displayed on display 160. Display image 300 comprises a desktop window (window D) and application windows A, B and C. Application windows A–C may represent the video output of one or more applications, such as applications 200 and 201 of FIG. 2. The desktop window (D) may represent output of window manager 202, or an associated windowing application. As shown, window A is partially occluded by windows B and C. Window B exists on top of, and within the borders of, window A, whereas window C overlaps the lower right corner of window A.

FIG. 3 also comprises clip-list 301, containing a list of rectangles associated with each application. The display region assigned to an application includes a patchwork of rectangles representing those portions of the display containing the application window, excluding those regions occluded by another overlying window. The visible (and thus writable) portions of desktop window (D) include rectangles D1, D2, D3, D4, D5 and D6. The visible portions of window A include rectangles A1, A2, A3, A4 and A5. Windows B and C, being on the top layer, are unoccluded. Windows B and C include rectangles B1 and C1, respectively.

Assuming that window A corresponds to application 200, when application 200 writes to frame buffer 140, application 200 will typically write only to those portions of the frame buffer corresponding to rectangles A1–A5. If the alignment state of windows A–C is modified, the clip-list will change accordingly. For example, if window B is closed or shifted behind window A, then rectangle B1 is reassigned to window A and application 200. Application 200 will recognize the change to the clip-list upon its next frame buffer access.

FIG. 4A is a flow diagram illustrating a process by which an application writes to the frame buffer. In step 400, the application obtains image data for output to a display. This image data may be obtained from another video source, from an image file, or from a rendered image, for example. The application queries the frame buffer lock in step 401, and, if the frame buffer lock is free, the application obtains the lock in step 402. However, if the lock is not free (i.e., another application or the window manager currently has it), the application must wait at step 401 until the lock is released by its current holder.

Once the lock is obtained in step 402, the application accesses the associated clip-list in step 403. Based on the information in the clip-list, the image data is clipped as needed in step 404. The clipped image data is written to the frame buffer in step 405 and subsequently displayed. In step 406, the application releases the frame buffer lock so that other applications, or the window manager, may have access.

The process by which the window manager interfaces with the clip-list is illustrated in FIG. 4B. In step 407, the window manager receives a message or event notification that a window event has occurred that affects the contents of the clip-list. In step 408, as with the applications, the window manager must determine whether the frame buffer lock is free. If the lock is free, the window manager may obtain the lock in step 409. If the lock is not free, the window manager must wait at step 408 until the lock becomes free (i.e., is released). Once the lock is obtained in step 409, the window manager accesses the clip-list in step 410 and performs those modifications called for by the message or event notification received in step 407. Once the clip-list has been updated, the window manager releases the frame buffer lock in step 411.

For a single computer system, the video display processes of FIGS. 4A and 4B may be adequate. The applications and window manager are linked to the frame buffer by a high-speed bus, and wait times for buffer access are acceptable. However, in a distributed networking environment, video applications (or services), as well as the window manager, may be distributed among multiple servers separated from the frame buffer (and clip-list) by an asynchronous, lossy, low-bandwidth network. These conditions lead to inefficiencies in the display process. For example, the need to access the clip-list across the network reduces the performance of the system by using valuable network bandwidth and inserting undesired transmission delays. Further, packet loss and latency can complicate the use of a mutual exclusion lock for accessing the frame buffer over a network. Latency adds to the undesired network delay, whereas packet loss (or a server crash) may result in failure of the lock to be released. A more efficient video display process for distributed networks is desired.

SUMMARY OF THE INVENTION

A method and apparatus for providing distributed clip-list management is described. In an embodiment of the invention, an application maintains a local clip-list that identifies those portions of a remote frame buffer that are unambiguously associated with the given application, as well as those portions of the remote frame buffer which are disputed between the given application and one or more other applications. Applications may enforce a dispute policy with respect to writing image data to disputed regions of the frame buffer. Applications are able to write to the frame buffer asynchronously, without the use of a frame buffer lock.

In one embodiment, a clip manager maintains a global clip-list, and responds to messages from the applications by updating the global clip-list and informing those other applications of relevant changes to their own respective local clip-lists. The portions of an application's clip-lists that have been previously claimed by other applications and which have not been acknowledged as lost by the other applications are referred to as disputed regions. Each application is kept informed about its current clip-list and any disputed regions within its current clip-list. The clip manager may be implemented as part of the window manager, or as a separate process.

In one embodiment, a policing process is implemented at or in line with the frame buffer to ensure that an application does not write to portions of the frame buffer that have been granted to another application. The operations of the policing process are coordinated by the clip manager.

DETAILED DESCRIPTION OF THE INVENTION

The invention is a method and apparatus for providing distributed clip-list management. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Implementation of a Distributed Network Video System

In an embodiment of the invention, one or more video applications (also referred to as "services") are executed on one or more servers or computational service providers coupled to a network. One or more thin clients or terminals are also coupled to the network. Each client or terminal has its own frame buffer driving a display device. Each client may be serviced by one or more of the multiple video applications on the network. A windows manager located on the network (e.g., executing on one of the servers) tracks those video applications registered to it, and executes an internal clip manager process, or, alternatively, works with a separate clip manager process on the network, to coordinate the transmission and display of video data from the multiple sources.

Figure 1:
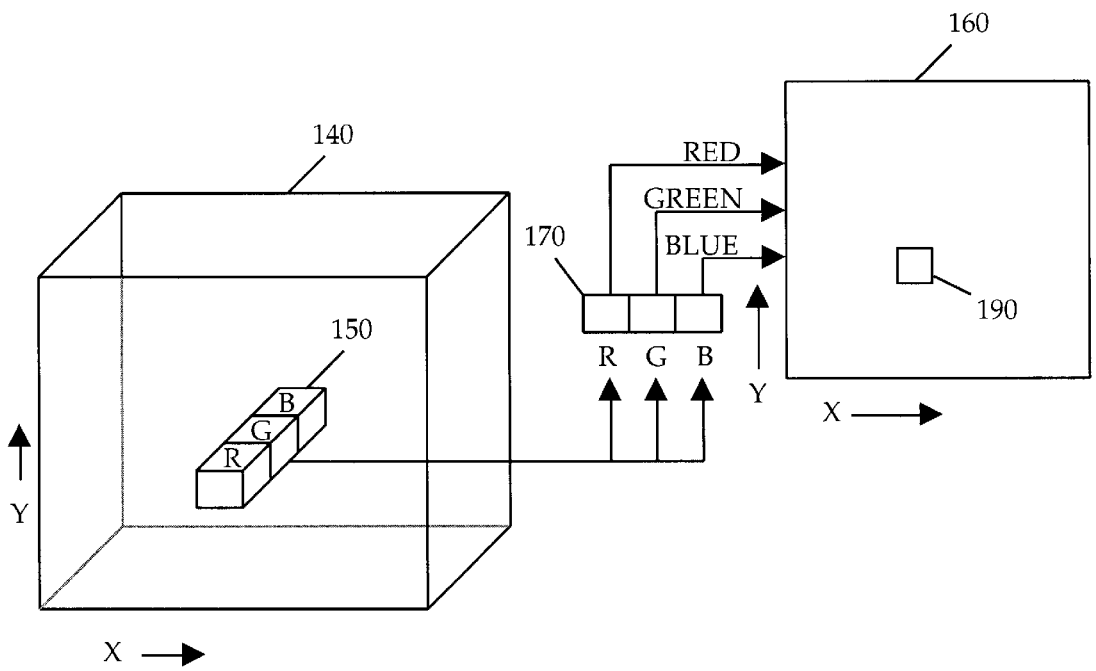
FIG. 1 is a block diagram of a video display apparatus.
Figure 2A:
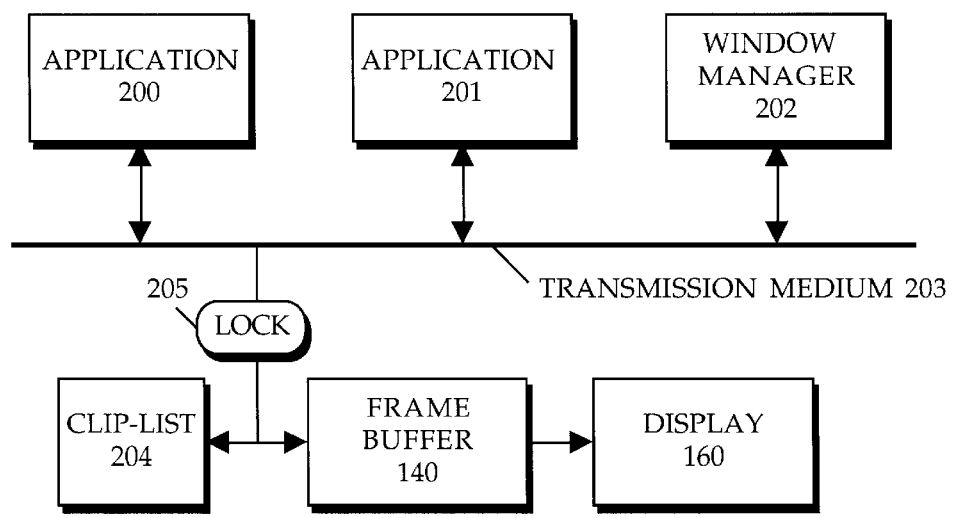
FIG. 2A is a block diagram of a video display system having multiple applications.
Figure 2B:
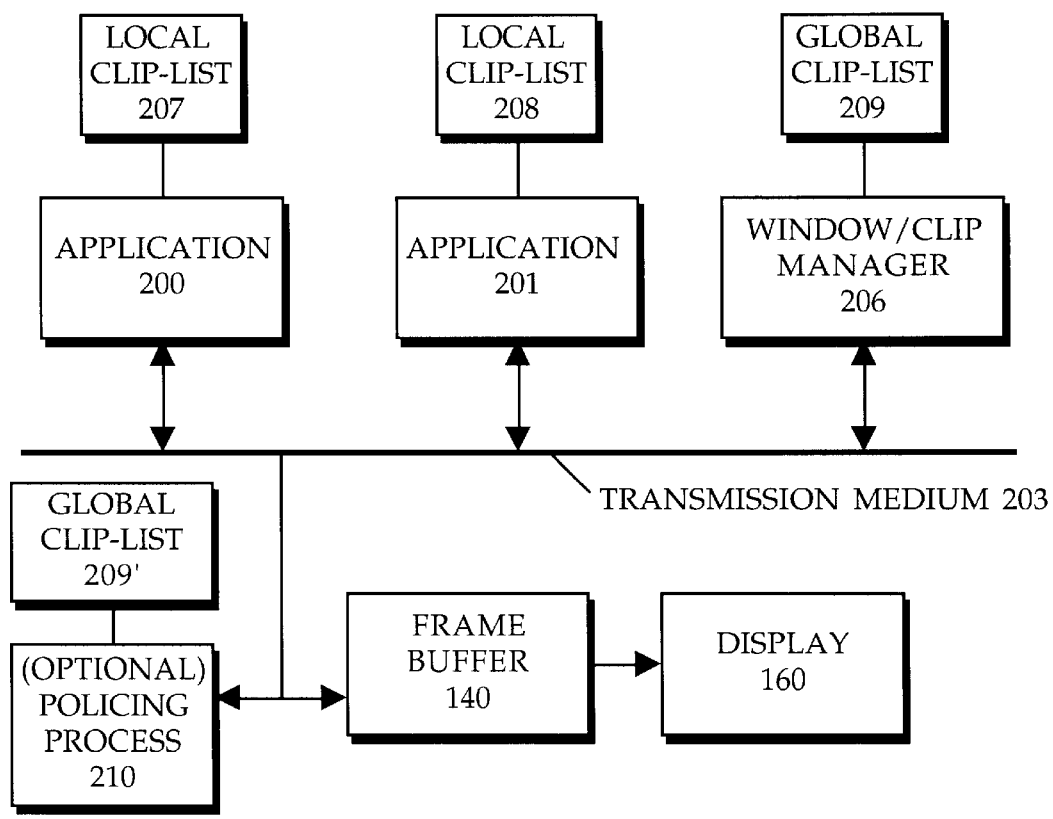
FIG. 2B is a block diagram of a distributed video display system in accordance with an embodiment of the invention.
Figure 3:
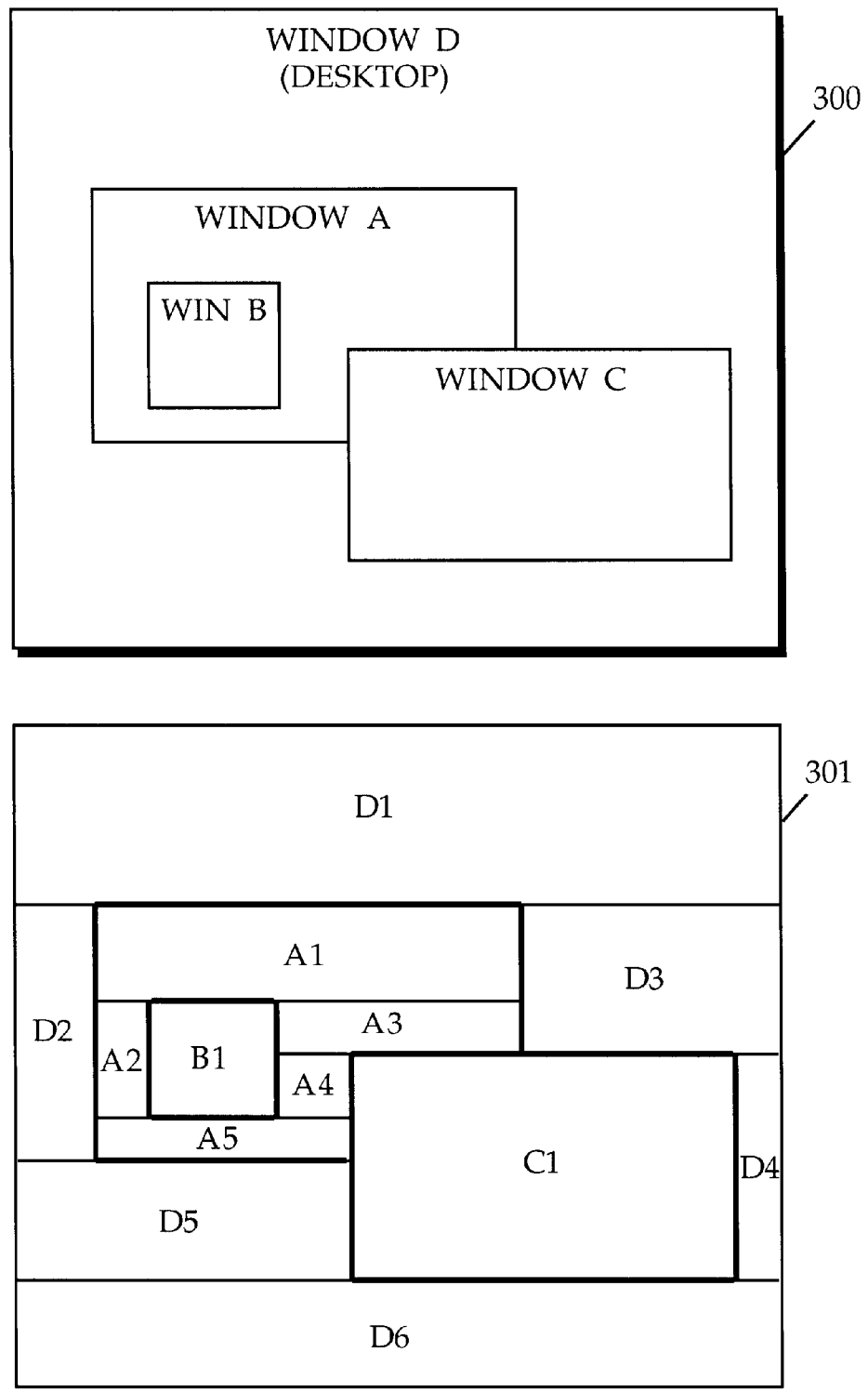
FIG. 3 illustrates a display having multiple overlapping windows, and an associated clip-list.
Figures 4A, 4B:
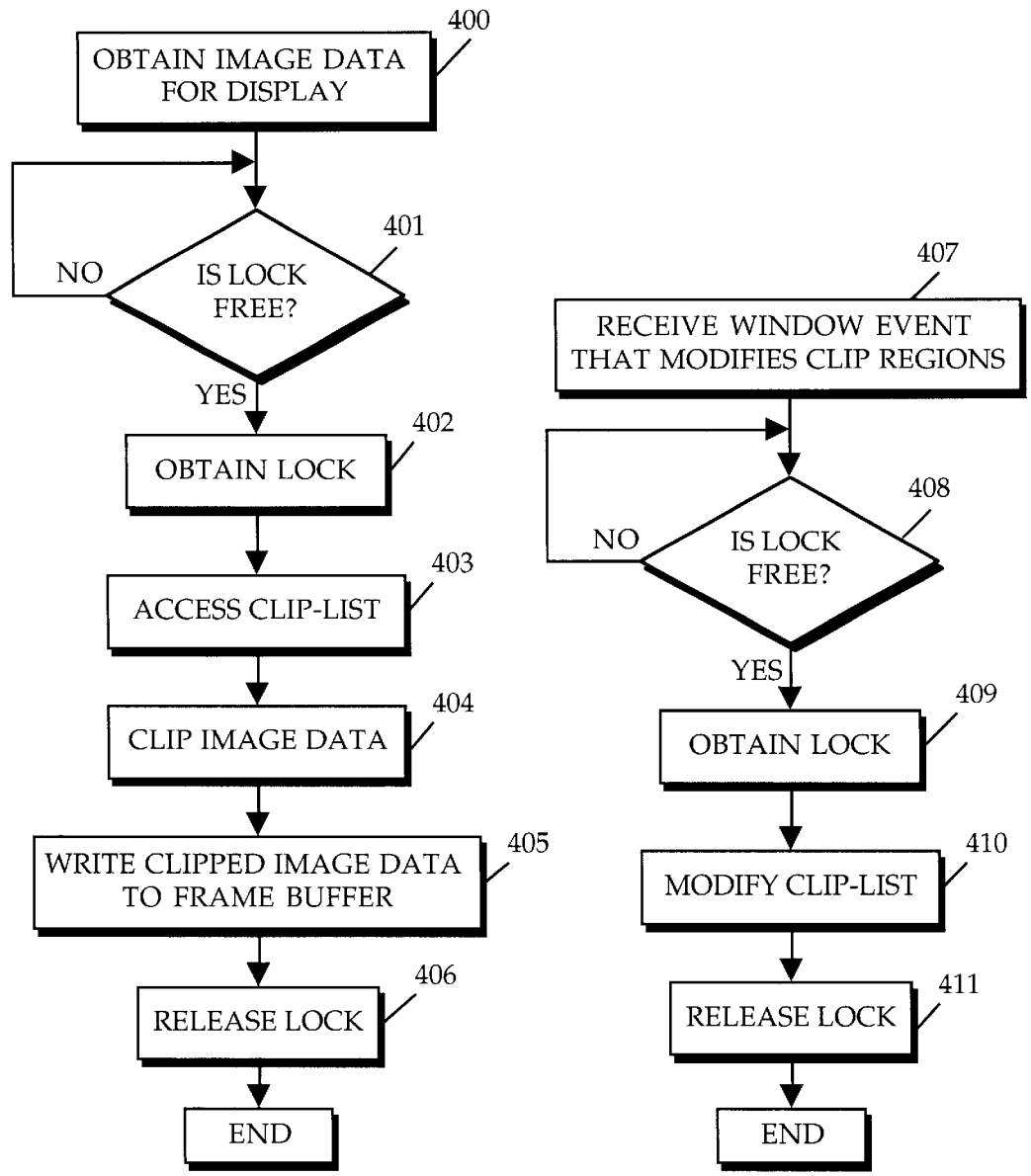
FIG. 4A is a flow diagram of a process for writing to a frame buffer.
FIG. 4B is a flow diagram of a process for modifying a clip-list.

FIG. 2B is a block diagram illustrating a distributed network video system in accordance with an embodiment of the invention. FIG. 2B comprises applications 200 and 201, window/clip manager 206 and frame buffer 140 coupled to transmission medium 203. Frame buffer 140 drives display device 160 as in FIG. 2A. The transmission medium 203 may comprise a local area network (LAN), wide area network (WAN) or other networking construct.

In contrast to the system of FIG. 2A, applications 200 and 201 have associated local clip-lists 207 and 208. Window/clip manager 206 is configured with an associated global clip-list 209. Also, coupled to frame buffer 140 are an optional policing process 210 and an associated global clip list 219'. By providing each application with a local clip-list, the system of FIG. 2B permits each application to perform asynchronous writes to the frame buffer at will. There is no delay on the network caused by one application waiting on another to finish a buffer access, and there is no transmission delay incurred for accessing a single clip-list at the site of the frame buffer. The write requests are received at the frame buffer and placed in a queue to be executed.

Because each application has a local clip-list, disputes will exist about ownership of certain clip regions while clip-list updates propagate from one application, through the window/clip manager 206, to another application. The applications may implement certain policies regarding processing of disputed clip regions based on the specific needs of the given application. Disputes are resolved when an application acknowledges transfer of a clip region via a message to window/clip manager 206. The policing process 210 may be implemented to prevent unauthorized writes to regions of the frame buffer, enforcing a dispute policy for those applications that do not respond quickly with acknowledgment messages. The policing process is designed for quick response, and receives updates to its global clip-list 209' from window/clip manager 206.

In one embodiment, the local clip-list (e.g., 207 and 208) for each application comprises a list of regions owned by that application, as well as a list of those regions owned by the application that may be disputed by other applications. The global clip-list 209 maintained by the clip manager 206 may comprise, for example, a list of regions currently in dispute by two or more applications, a respective list of owned regions for each registered application, and a respective list for each application of those regions for which the clip manager is awaiting acknowledgment (i.e., awaiting a message from the given application accepting that the given application no longer owns the region). If implemented, the policing mechanism 210 maintains a subset 209' of the global clip-list 209 which contains those regions owned by each application. Dispute and acknowledgment information are not needed by the policing mechanism.

Figure 5:
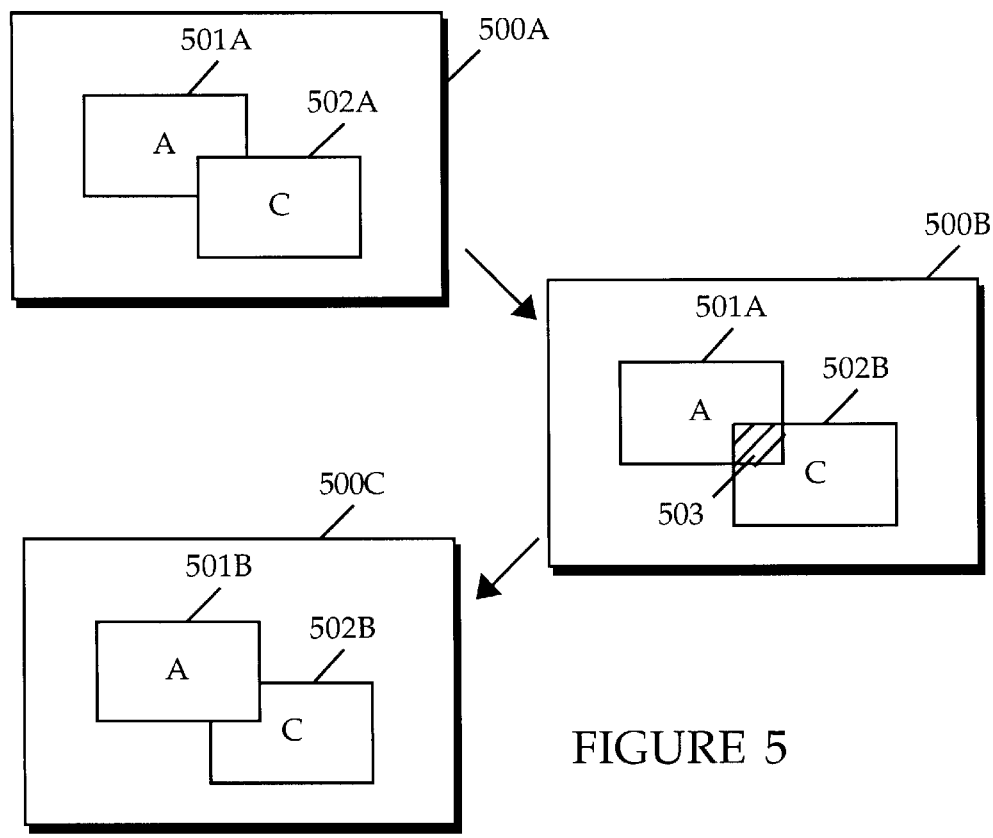
FIG. 5 is a block diagram illustrating the transfer of a clip region from one application to another in accordance with an embodiment of the invention.

FIG. 5 is a block diagram illustrating a clip region transfer in accordance with an embodiment of the invention. The example of FIG. 5 depicts a window A (e.g., supported by application 200) moving to the top of the display window such that a previously visible portion of a window C (e.g., supported by application 201) is occluded by a portion of window A. Initially, window A comprises clip region 501A in clip-list 500A, and window C comprises clip region 502A. As shown, clip-list 500A contains no disputed regions.

When window A rises to the top level of the display, application 200 asserts control over all occluded portions of window A as shown in clip-list 500B. A dispute arises over the intersection of window A and window C, i.e., in clip region 503. Here, application 201 has not acknowledged window A's control. Application 200 still holds undisputed control over clip region 501A, whereas application 201 now holds undisputed control only over clip region 502B (the subtraction of region 503 from region 502A). Application 200 and 201 may both write to the disputed clip region based on their respective dispute policies. Nothing prevents either of applications 200 and 201 from performing writes to their undisputed clip regions 501A and 502B, respectively. Therefore, even during the dispute resolution process, there is no need to wait.

In clip-list 500C, application 201 has acknowledged that it no longer controls clip region 503, and has released that region. Region 503 is thus no longer in dispute. Application 200 holds undisputed control over clip region 501B (the union of regions 501A and 503).

Figure 6:
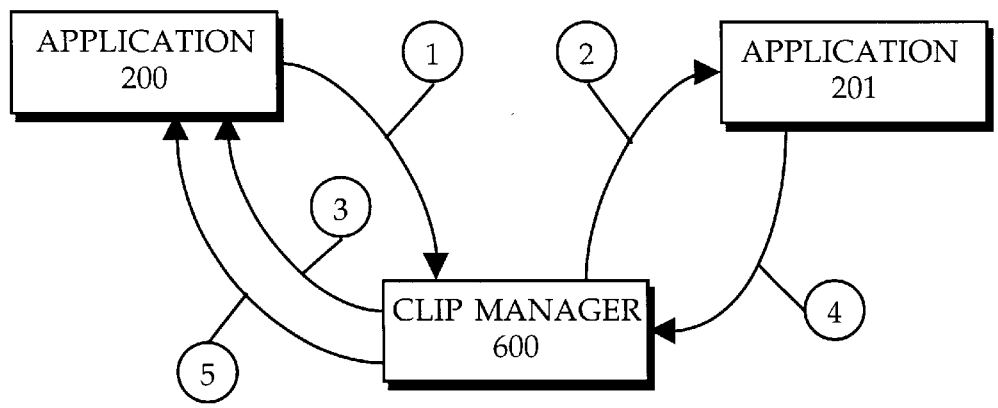
FIG. 6 is a block diagram of a messaging system for transferring a clip region from one application to another in accordance with an embodiment of the invention.

FIG. 6 illustrates the message passing involved in a clip region transfer between two applications, such as in the example of FIG. 5. The concepts of FIG. 6 may be similarly applied to transfers of clip regions between more than two applications.

Application 200, wishing to assert control over clip region 501B, sends a "clip change" message (1) to clip manager 600. The clip change message includes, for example, a copy of clip region 501B. In response to the clip change message, clip manager 600 modifies the global clip-list to reflect that application 200 controls region 501B (though region 503 is in dispute with application 201), and sends a preliminary acknowledgment (3) back to application 200, detailing the currently disputed regions in its area. At this point, application 200 can update the area immediately or wait for an acknowledgment according to its dispute policy. At approximately the same time (though the relative order of messages (2) and (3) is unimportant), clip manager 600 sends a "change" message (2) to application 201 to inform the application that it now controls region 502B. The change message (2) contains, for example, a copy of region 502B. Clip manager 600 also tracks (e.g., in an ACK list) those regions (including region 503) for which it awaits acknowledgment (i.e., release) from application 201.

In response to the change message from clip manager 600, application 201 modifies its own local clip-list. Application 201 also sends "acknowledge" message (4) to clip manager 600 confirming the modified region 502B now controlled by application 201, and releasing region 503. This acknowledge message may contain, for example, a simple restating of application 201's region of control (i.e., 502B) for confirmation, or the acknowledge message may consist of the return of a unique identifier that the clip manager associated with the clip-list configuration (e.g., an event count).

Once clip manager 600 receives acknowledge message (4), clip manager 600 removes region 503 from its acknowledgment waiting list and also removes 503 from the set of disputed regions. Clip manager 600 forwards an acknowledge message (5) to application 200, informing the application that region 503 is no longer in dispute. Application 200 then has the option of writing to the newly undisputed region depending on the application's update policy. If the optional policing mechanism is available, once the policing mechanism acknowledges the clip-list change, the region is no longer marked as disputed. This is possible since the prior owner of the region will be prohibited from writing to the region.

Table I below represents one possible timeline of message events in the messaging example of FIG. 6. Tables II–IV represent the local clip-lists for applications 200 and 201 and the global clip-list for clip manager 600. The tables for the local clip-lists (II and III) show the owned and disputed regions for the given application subsequent to the time ($T_M$) the identified message is posted. The table for the global clip-list (IV) identifies the regions assigned to the respective applications, the acknowledgment waiting list for each application and all regions in dispute.

TABLE I

Clip Event Timing

| $T_M$ | Event Description |
| --- | --- |
| 0 | Message 1 is sent |
| 1 | Message 1 is received, messages 2 and 3 are sent |
| 2 | Message 2 is received, message 4 is sent |
| 3 | Message 3 is received |
| 4 | Message 4 is received, message 5 is sent |
| 5 | Message 5 is received |

TABLE II

Application 200 Local Clip-List

| $T_M$ | Owned | Disputed |
| --- | --- | --- |
| 0 | 501A | — |
| 1 | 501A | — |
| 2 | 501A | — |
| 3 | 501B | 503 |
| 4 | 501B | 503 |
| 5 | 501B | — |

TABLE III

Application 201 Local Clip-List

| $T_M$ | Owned | Disputed |
| --- | --- | --- |
| 0 | 502A | — |
| 1 | 502A | — |
| 2 | 502B | — |
| 3 | 502B | — |
| 4 | 502B | — |
| 5 | 502B | — |

TABLE IV

Clip Manager Global Clip-List

| $T_M$ | App 200 | App 200 ack | App 201 | App 201 ack | Disputed |
| --- | --- | --- | --- | --- | --- |
| 0 | 501A | — | 502A | — | — |
| 1 | 501B | — | 502B | 503 | 503 |
| 2 | 501B | — | 502B | 503 | 503 |
| 3 | 501B | — | 502B | 503 | 503 |
| 4 | 501B | — | 502B | — | — |
| 5 | 501B | — | 502B | — | — |

As shown, the "owned" regions list in Table II changes to reflect the new clip region 501B when the first acknowledgment message (3) is received. (In an embodiment in which application 200 is unconcerned with acknowledgment messages, application 200 may be configured to change the owned regions list at time 0 when message (1) is sent to the clip manager.) Region 503 is added to the "disputed" regions list of Table II when the first acknowledgment message (3) is received, and subtracted from the "disputed" regions list when the second acknowledgment message (5) is received. The "owned" regions list in Table III changes from 502A to 502B when the change message (2) originating from clip manager 600 is received by application 201.

The global list of Table IV changes state after clip manager 600 receives each of messages (1) and (4). Receipt of message (1) causes the owned regions list for application 200 to be updated from region 501A to 501B. At the time message (2) is sent to application 201, the owned regions list for application 201 is updated from 502A to 502B, and region 503 is added to the disputed regions list and the acknowledgment (ack) wait list for application 201. When the clip manager receives message (4) from application 201, region 503 is removed from the disputed regions list (if it is not disputed with any other applications aside from application 201) and also removed from the acknowledgment wait list for application 201.

Figure 7A:
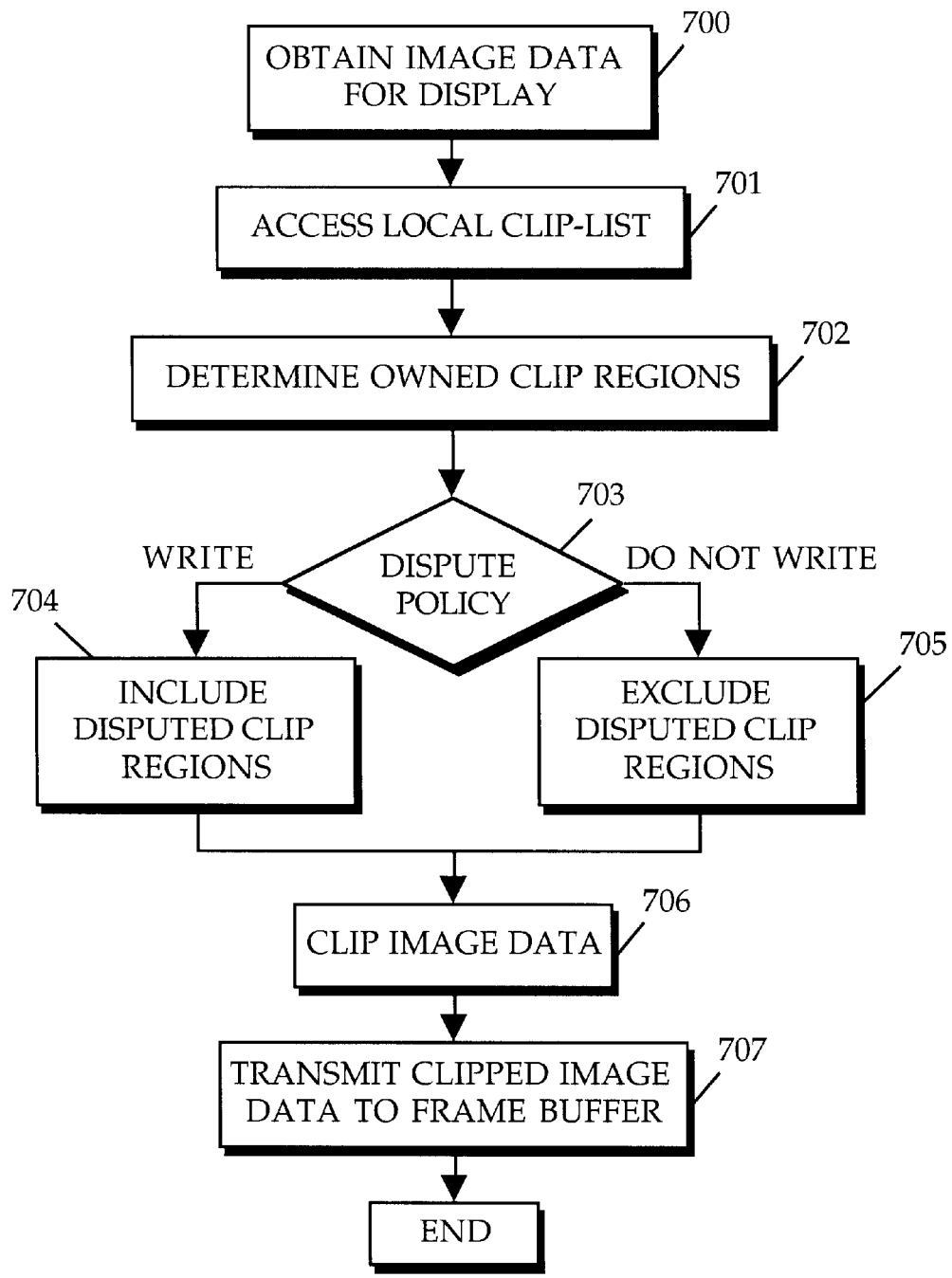
FIG. 7A is a flow diagram of a process for writing to a frame buffer in accordance with an embodiment of the invention.

FIG. 7A is a flow diagram illustrating an application process for writing to a frame buffer in accordance with an embodiment of the invention. In step 700, the application obtains image data to be output to the display. In step 701, the local clip list associated with the application is accessed. In step 702, the undisputed clip regions assigned to the application are determined from the local clip list.

In step 703, a dispute policy is implemented by the application. If the dispute policy is a "write through" policy, in step 704, the disputed clip regions associated with the application are included with the undisputed clip regions for clipping purposes. If the dispute policy is a "wait" policy, in step 704, the disputed clip regions are excluded from consideration for the frame buffer write operation. In step 706, the image data is clipped in accordance with the policy implemented in step 704 or step 705, and in step 707, the clipped image data is transmitted to the frame buffer over the network.

Figure 7B:
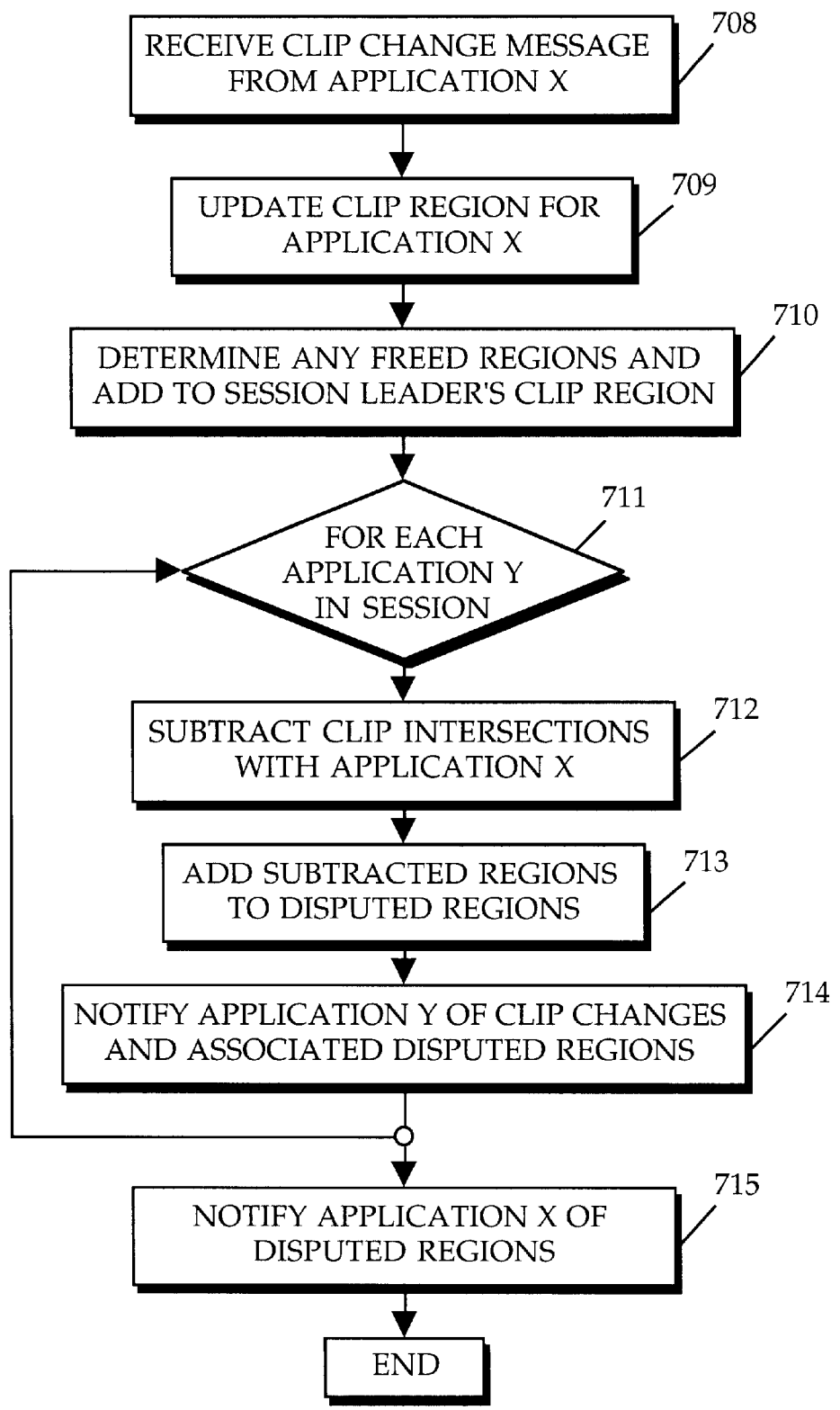
FIG. 7B is a flow diagram of clip manager process for handling a clip change message in accordance with an embodiment of the invention.

FIG. 7B is a flow diagram illustrating a clip manager process for handling receipt of a "clip change" message (e.g., message (1)) from an application X, in accordance with an embodiment of the invention. In step 708, the clip change message from an application X is received by the clip manager. In step 709, the clip manager updates the clip regions associated with application X in the global clip list. Any regions that are freed by the clip change (i.e., do not currently belong to any application) are determined in step 710, and added to the session leader's clip region in the global clip list. The session leader may be, for example, the window manager or another application that has registered with the clip manager as leader of the session.

In step 711, the clip manager begins processing through all registered applications (referred to as application Y) such that steps 712–714 are applied to each registered application in turn. In step 712, for a current application Y from the set of registered applications, the intersections between the clip region for application X and the clip region for application Y are determined, and subtracted from the clip region of application Y. In step 713, the subtracted intersection regions determined in step 712 are added to the disputed regions in the global clip list. In step 714, application Y is notified (e.g., via message (2)) of the changes to its clip regions incurred in step 712, and, optionally, of all current disputed regions in areas still controlled by application Y. After step 714, the clip manager process returns to step 711 to process the next application from the set of registered applications. Once all registered applications have been processed, handling of the clip changed message is completed, and, at step 715, application X is optionally notified of the set of disputed regions associated with its owned regions (e.g., via message (3)).

The notifications of steps 714 and 715 may be eliminated under control of application X if those notifications are not needed. For example, in a streaming video application, the application may not be concerned with implementing an update policy for disputed regions because such disputed regions are automatically updated by successive video frame writes.

Figure 7C:
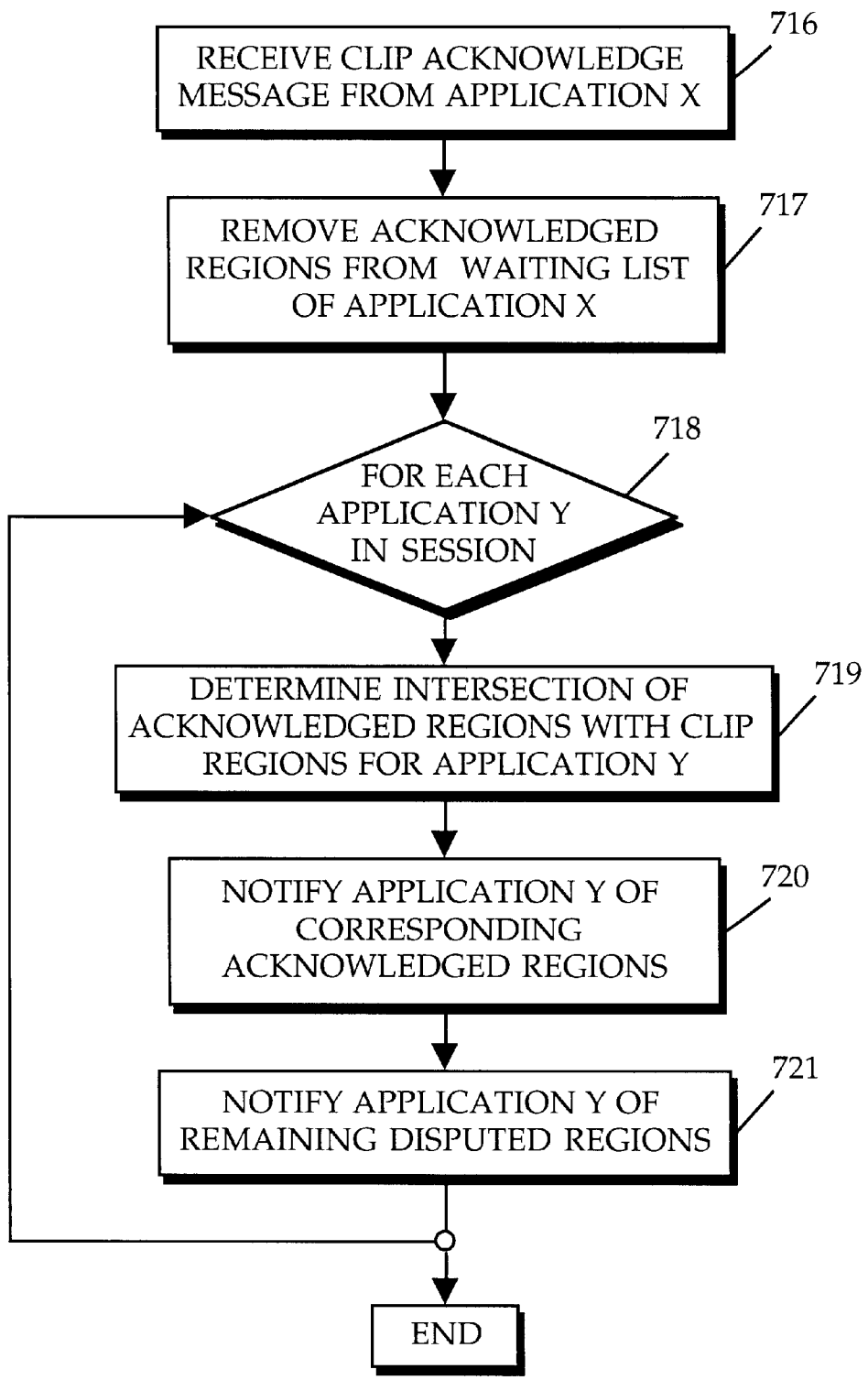
FIG. 7C is a flow diagram of a clip manager process for handling an acknowledgment message in accordance with an embodiment of the invention.

FIG. 7C is a flow diagram illustrating a clip manager process for handling a "clip acknowledge" message (4) from an application X, in accordance with an embodiment of the invention. In step 716, the clip manager receives the clip acknowledge message from application X. As described previously, the acknowledgment may comprise, for example, a confirmation copy of the application's clip region or a unique identifier associated with the clip change by the clip manager, such as an event count. In step 717, the clip manager removes the acknowledged regions from an acknowledged waiting list associated with application X in the global clip list.

In step 718, the clip manager begins processing through all registered applications to carry out steps 719–721 on each registered application in turn, with the current application under consideration referred to as application Y. In step 719, the clip manager determines the intersection of the acknowledged regions of application X with the clip region for a current application Y from the set of registered applications. Steps 720 and 721 are optionally implemented. In step 720, application Y is notified of the corresponding acknowledged regions determined in step 719. In step 721, the clip manager notifies application Y of all remaining disputed regions associated with application Y. Steps 718–721 are then carried out in turn for each remaining registered application.

Figure 7D:
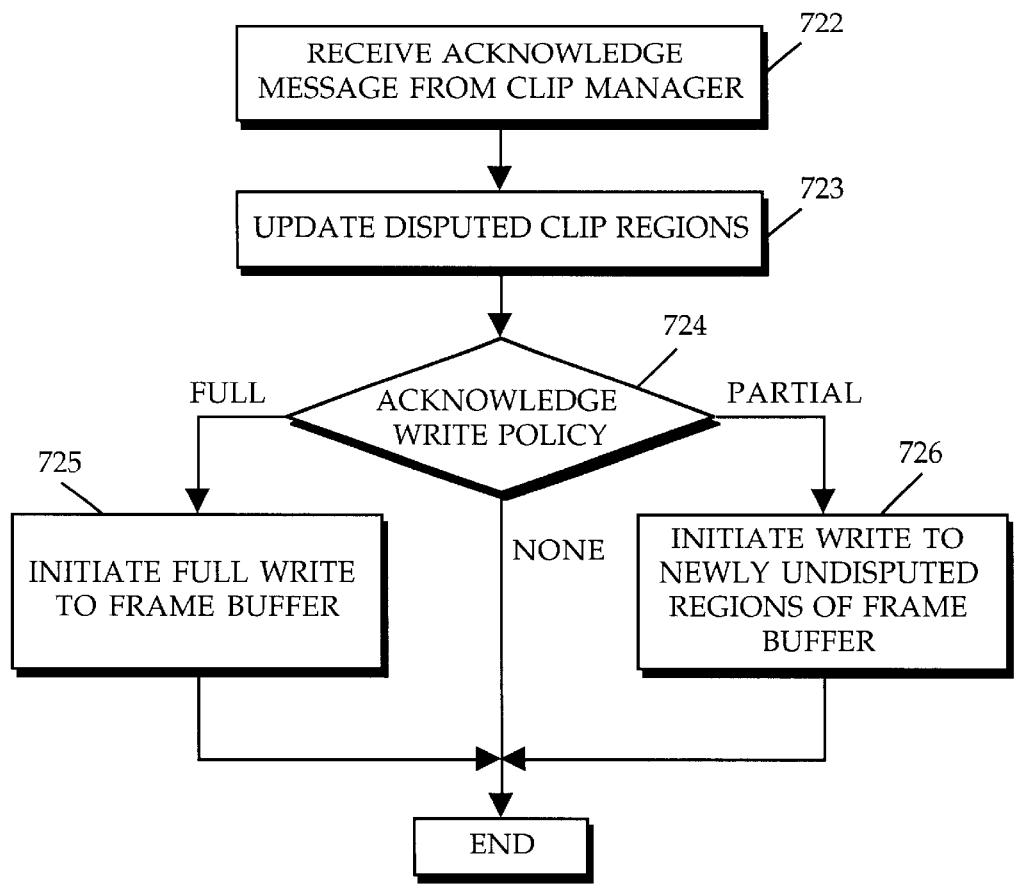
FIG. 7D is a flow diagram of an application process for handling an acknowledgment message in accordance with an embodiment of the invention.

FIG. 7D is a flow diagram illustrating an application process for handling receipt of an acknowledge message from the clip manager. The application receives the acknowledge message from the clip manager in step 722, and, in step 723, the application updates its disputed and undisputed clipped regions specified in the local clip list.

The application is free to implement an "acknowledge update" policy in step 724. If the application implements a "full update" policy, in step 725, the application initiates a full frame buffer write operation (as described in FIG. 7A) before completing. If the application implements a "partial update" policy, in step 726, the application initiates a write to those regions of the frame buffer corresponding only to the newly undisputed regions in the local clip list before completing. If the application implements no update policy, then the handling process is completed.

The update policies of steps 725 and 726 may be useful for ensuring that portions of a display are corrected in the face of undesired writing of image data by another application while the region was in dispute. The implementation of no update policy may be appropriate for applications such as streaming video where the display will be updated by a following frame, rendering correction of the display unnecessary.

Figure 7E:
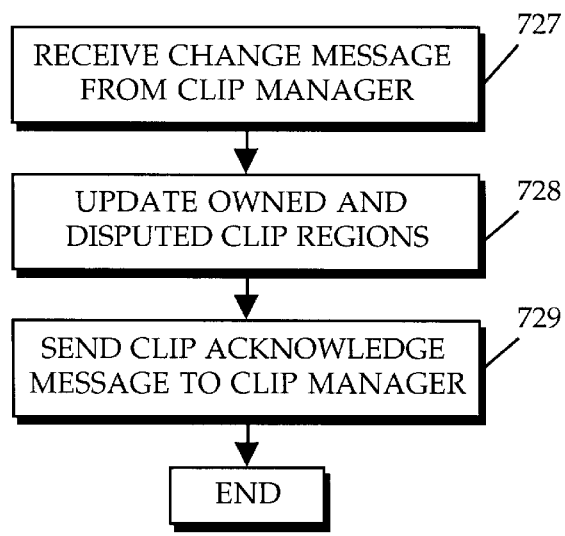
FIG. 7E is a flow diagram of an application process for handling a change message in accordance with an embodiment of the invention.

FIG. 7E is a flow diagram illustrating an application process for handling receipt of a change message from the clip manager, in accordance with an embodiment of the invention. In step 727, the application receives the change message from the clip manager, and in step 728, the application updates the disputed and undisputed clip regions in the local clip list. In step 729, the application forwards a clip acknowledge message to the clip manager before completing.

The policing mechanism responds to updates from the clip manager in a similar manner to that described in FIG. 7E for applications. However, the policing mechanism may not receive, or may ignore, dispute information. Clip updates are received from the clip manager regarding owned clip regions for one or more applications. The policing mechanism applies those updates to its own clip-list and may optionally send an acknowledgment to the clip manager. The policing mechanism monitors all writes to the frame buffer to enforce clip ownership in accordance with the current state of its clip-list. In accordance with one embodiment, applications attempting to write to clip regions that they no longer own are denied by the policing mechanism, whereas current owners of clip regions are permitted to write to their respective owned regions as desired. Permitted write operations may proceed without the need to wait for acquisition of a lock.

Video Protocol Embodiment

In an embodiment of the invention, a video protocol is implemented in which data packets are used to transmit variably sized blocks of video data between a server supporting an application and a client having a frame buffer, using a connectionless datagram scheme. A connectionless scheme means that each packet of video data, i.e., each video block, is processed as an independent unit, and the loss of a data packet does not affect the processing of other data packets. This independence provides for robust video processing even on unreliable networks where packet loss may be commonplace.

Some networks are prone to periodic packet loss, i.e., packet loss at regular intervals. This periodic behavior can result in the stagnation of portions of the video display as the same video blocks are repeatedly lost. To prevent video block stagnation, the spatial order in which video blocks are sent to the receiver for display may be pseudo-randomly determined to disrupt any periodicity in packet performance.

In one embodiment, the data packets containing video data are provided with a sequence number. By tracking the sequence numbers, the receiver can note when a sequence number is skipped, indicating that the packet was lost during transmission. The receiver can then return to the transmitter a list or range of sequence numbers identifying the lost packet or packets. When the transmitter receives the list or range of sequences, the transmitter can decide whether to ignore the missed packets, resend the missed packets (such as for still images), or send updated packets (such as for streaming video that may have changed since the packet was lost). In one embodiment of the invention, the video data packet comprises the following information:

Sequence number—A video stream is processed as a series of blocks of video data. The sequence number provides a mechanism for the receiver to tell the transmitter what sequence numbers have been missed (e.g., due to packet loss), so that the transmitter may determine whether to resend, update or ignore the associated video block.

X—The X field designates the x-coordinate of the receiver's display device where the video block is to be displayed, e.g., the x-coordinate of the first pixel (i.e., the upper-left corner) of the video block.

Y—The Y field designates the y-coordinate of the receiver's display device where the video block is to be displayed, e.g., the y-coordinate of the first pixel (i.e., the upper-left corner) of the video block.

Width—The width field specifies the width of the destination rectangle on the receiver's display device wherein the video block is to be displayed.

Height—The height field specifies the height of the destination rectangle on the receiver's display device wherein the video block is to be displayed.

Source_w—The source width specifies the width of the video block in pixels. Note that the source width may be smaller than the width of the destination rectangle on the receiver's display device. If this is so, the receiver will upscale the video block horizontally to fill the width of the destination rectangle. The source width should not be larger than the width of the destination rectangle as this implies downscaling, which should be performed by the transmitter for efficiency.

Source_h—The source height specifies the height of the video block in pixels. Note that, as with source_w, the source height may be smaller than the height of the destination rectangle on the receiver's display device. As above, the receiver will upscale the video block vertically to fill the height of the destination rectangle. The source height should not be larger than the height of the destination rectangle as this implies downscaling, which should be performed by the transmitter for efficiency.

Luma encoding—The luma encoding field allows the transmitter to designate a particular luma encoding scheme from a set of specified luma encoding schemes.

Chroma_sub_X—This field allows the transmitter to designate the degree of horizontal subsampling performed on the video data chroma values.

Chroma_sub_Y—This field allows the transmitter to designate the degree of vertical subsampling performed on the video data chroma values.

Video data—The video data includes (source_w*source_h) pixel luma values (Y), and ((source_w/chroma_sub_x)*(source_h/chroma_sub_y)) signed chroma values (U, V or Cb, Cr).

YUV (Y'CbCr) Color

In an embodiment of the invention, the color model of the video protocol is specified by the International Telecommunications Union in ITU.BT-601 referring to an international standard for digital coding of television pictures using video data components Y'CbCr, where Y' is a luminance or "luma" value, Cb (or U') is a first chromaticity or "chroma" value represented as a blue color difference proportional to (B'−Y') and Cr (or V') is a second chroma value represented as a red color difference proportional to (R'−Y') (Note that primed values such as Y' indicate a gamma corrected value). This ITU specification is independent of any scanning standard and makes no assumptions regarding the "white" point or CRT gamma. For 0←(R,G,B)←1, the range for Y' is 0←Y'←1 and the range for Cb and Cr is −0.5←(Cb, Cr)←0.5.

The R'G'B' <—> Y'CbCr color transforms are as follows:

$$\begin{bmatrix} Y' \\ U' \\ V' \end{bmatrix} = \begin{bmatrix} Y' \\ Cb \\ Cr \end{bmatrix} = \begin{bmatrix} 0.299 & 0.587 & 0.114 \\ -0.169 & -0.331 & 0.500 \\ 0.500 & -0.419 & -0.081 \end{bmatrix} \cdot \begin{bmatrix} R' \\ G' \\ B' \end{bmatrix}$$

$$\begin{bmatrix} R' \\ G' \\ B' \end{bmatrix} = \begin{bmatrix} 1 & 0 & 1.403 \\ 1 & -0.344 & -0.714 \\ 1 & 1.773 & 0 \end{bmatrix} \cdot \begin{bmatrix} Y' \\ U' \\ V' \end{bmatrix}$$

Under the specified protocol, the transmitter performs any transformations required to convert the video data into the YUV format. This may include performing the RGB to YUV matrix conversion shown above to convert RGB data. Transformations may also include decompression from other color formats (e.g., H.261, MPEG1, etc.). The receiver can drive an RGB display device by performing the above matrix operation to convert incoming YUV (Y'CbCr) data received from a transmitter into RGB data for display at the display rectangle identified in the data packet. No other color transformations are necessary at the receiver. The receiver is also able to accept RGB data in the same video block format because RGB data is directly supported in the receiver. For transmission efficiency, however, any sizable video data transfers between a transmitter and receiver should be performed in the YUV color format to take advantage of the compression schemes described below.

Luma Compression

In each data packet containing a video block, there are (source_w*source_h) luma values—one for each pixel. If the luma encoding field indicates that no encoding is being performed, the luma values are unsigned eight-bit values. If, however, luma encoding is indicated in the luma encoding field, the luma values are encoded to achieve a compression ratio of 2:1. In an embodiment of the invention, the luma value "Y" is compressed using a quantized differential coding (QDC) scheme. In other embodiments, other compression schemes may be specified in the luma encoding field.

Luma values do not tend to vary significantly from one pixel to another. It is therefore possible to transmit the difference value between luma values for consecutive pixels rather than the luma values themselves. Further, the luma difference values can be satisfactorily quantized to one of sixteen quantization levels, each of which is identified by a four-bit code word. The quantization is non-linear, with more quantization levels near zero where luma differences between consecutive pixels are more likely to occur.

In one embodiment, the luma difference quantization is performed according to the following table:

| Difference Range | Code (Binary) | Quantized Difference Level |
|---|---|---|
| −255 to −91 | 0 (0000) | −100 |
| −90 to −71 | 1 (0001) | −80 |
| −70 to −51 | 2 (0010) | −60 |
| −50 to −31 | 3 (0011) | −40 |
| −30 to −16 | 4 (0100) | −20 |
| −15 to −8 | 5 (0101) | −10 |
| −7 to −3 | 6 (0110) | −4 |
| −2 to 0 | 7 (0111) | −1 |
| 1 to 2 | 8 (1000) | 1 |
| 3 to 7 | 9 (1001) | 4 |
| 8 to 15 | 10 (1010) | 10 |
| 16 to 30 | 11 (1011) | 20 |
| 31 to 50 | 12 (1100) | 40 |
| 51 to 70 | 13 (1101) | 60 |
| 71 to 90 | 14 (1110) | 80 |
| 91 to 255 | 15 (1111) | 100 |

The luma compression scheme is based on a subtraction of a "last_value" from the current pixel luma value to generate the luma difference. "Last_value" is used to model the luma value of the preceding pixel. To prevent divergence of the compression and decompression processes, the "last_value" is modeled to account for the previous quantized luma difference rather than to match the actual luma value of the last pixel. The modeled "last_value" in the compression process therefore matches the corresponding modeled "last_value" extracted in the decompression process.

Chroma Compression

The human eye is less sensitive to chroma information than to luma information, particularly in a spatial sense. For example, if, in generating an image, some of the chroma information is spread beyond the actual edges of an object in the image, the human eye will typically pick up on the edge cues provided by the luma information and overlook the inaccuracies in the spatial location of the chroma information. For this reason, some latitude can be taken with the manner in which chroma information is provided. Specifically, subsampling may be performed without significantly degrading visual quality.

In accordance with an embodiment of the invention, the amount of chroma information, and hence the amount of chroma compression, is specified by the chroma_sub_X and chroma_sub_Y fields in the video block data packet. If the values for both of those fields are zero, then there is no chroma information and the video block is monochrome, i.e., luma only. One possible specification for chroma subsampling is:

0—No chroma values; monochrome image

1—Subsample by one (i.e., no subsampling)

2—Subsample by two

3—Subsample by four

Further subsample arrangements may be provided by extending the above specification. Chroma_sub_X and chroma_sub_Y independently specify subsampling along respective axes. Several subsampling arrangements achieved by different combinations of chroma_sub_X and chroma_sub_Y, as defined above, are:

| chroma sub X | chroma sub Y | one chroma value per | compression |
|---|---|---|---|
| 0 | 0 | 0, no chroma data | — |
| 0 | 1 | not permitted | — |
| 1 | 0 | not permitted | — |
| 1 | 1 | pixel | 1:1 |
| 2 | 1 | 1 × 2 pixel array | 2:1 |
| 1 | 2 | 2 × 1 pixel array | 2:1 |
| 3 | 1 | 1 × 4 pixel array | 4:1 |
| 1 | 3 | 4 × 1 pixel array | 4:1 |
| 3 | 2 | 2 × 4 pixel array | 8:1 |
| 2 | 3 | 4 × 2 pixel array | 8:1 |
| 3 | 3 | 4 × 4 pixel array | 16:1 |

Subsampling may be performed when packing data into a video block data packet by taking data only at the specified intervals in the specified directions. For example, for encoded value (chroma_sub_X, chroma_sub_Y)=(3, 2), chroma data would be taken at every fourth pixel along each row, and every other row would be skipped. Other schemes may be used to select a single pixel from the subsampling matrix, such as pseudo-random assignments. Further, the chroma values from each pixel in a subsampling matrix may be used to calculate a single set of average chroma values (U, V) for each subsampling matrix.

Subsampling is performed as the video block data packet is being packed and may occur before or after luma compression as luma and chroma compression are substantially independent. When the video block data packet reaches the receiver, the chroma subsamples are upsampled prior to being converted to RGB. Upsampling may be accomplished by taking the subsampled chroma information and duplicating or interpolating the chroma values for each pixel in the associated subsampling matrix.

Upscaling and Downscaling of Video Data

In an embodiment of the invention, the pixel array size of the source video block may differ from the size of the destination rectangle on the receiver's display. This size variation allows for a receiver with a large display to "blow up" or upscale a small video scene to make better use of the display resources. For example, a receiver may wish to upscale a 640×480 video stream to fill a 1024×1024 area on a large display device. Also, a receiver may have a smaller display than the size of a video stream. For this case, the video stream should be scaled down to be fully visible on the small display.

In accordance with an embodiment of the invention, upscaling is performed by the receiver, whereas downscaling is performed by the transmitter. One reason for this segregation of scaling duties is that scaled down video data requires lower network bandwidth to transmit. By downscaling video data on its own, the transmitter avoids sending video data that would be later discarded by the receiver. This also permits some simplification of the receiver in that resources, such as software code for downscaling video data, are not needed at the receiver.

Upscaling typically involves duplication of video data. It would be inefficient to send duplicated video data over a network. Therefore, the receiver performs all upscaling operations after receipt of the video data in its smaller form. Upscaling of video data is supported in the fields associated with the video data packet. Specifically, the video protocol provides separate fields for specifying the video source pixel array size and the destination display rectangle size. The amount of horizontal scaling is (width/source_w), and the amount of vertical scaling is (height/source_h).

Upscaling is performed after the video data has been decompressed and transformed into RGB format, though in certain embodiments upscaling may precede, or be combined with, the decompression steps. The receiver expands the video data vertically, horizontally or both as need to make the video data fill the designated display rectangle. Expanding video data may be performed as simply as doubling pixel values, but more advanced image filtering techniques may be used to affect re-sampling of the image for better display quality.

Embodiment of Computer Execution Environment
(Hardware)

Figure 8:
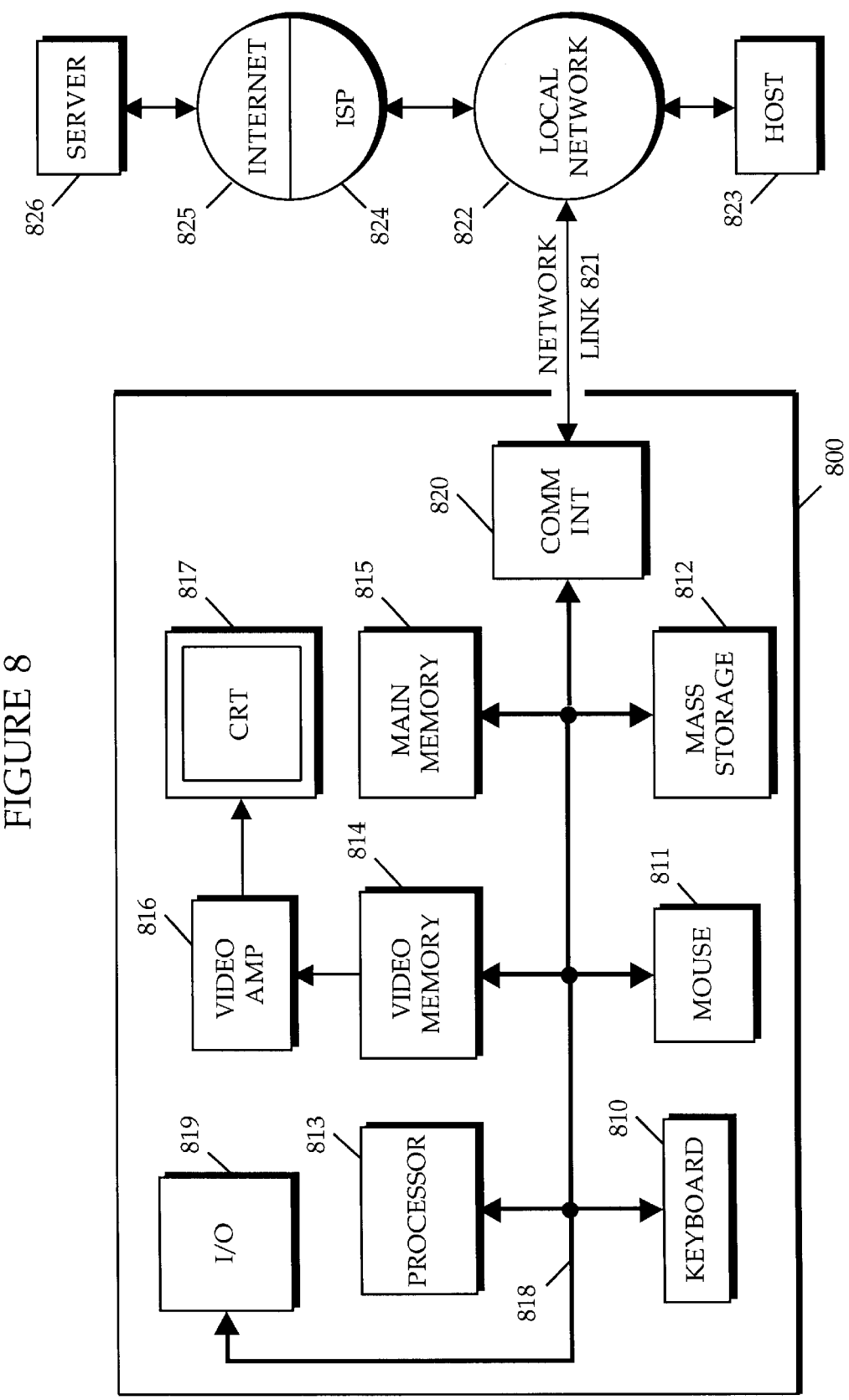
FIG. 8 is a block diagram of a computer execution environment.

An embodiment of the invention can be implemented as computer software in the form of computer readable code executed on a general purpose computer such as computer 800 illustrated in FIG. 8, or in the form of bytecode class files executable within a runtime environment (e.g., the Java runtime environment) running on such a computer. Optionally, a keyboard 810 and mouse 811 (or other pointing device) are coupled directly or indirectly to system bus 818. The keyboard and mouse are for introducing user input to the computer system and communicating that user input to processor 813. Other suitable input devices may be used in addition to, or in place of, the mouse 811 and keyboard 810. I/O (input/output) unit 819 coupled to system bus 818 represents such I/O elements as a printer, A/V (audio/video) I/O, etc.

Computer 800 includes a video memory 814, main memory 815 and, optionally, mass storage 812, all coupled to system bus 818 along with keyboard 810, mouse 811 and processor 813. The mass storage 812 may include both fixed and removable media, such as magnetic, optical or magnetic optical storage systems or any other available mass storage technology. Bus 818 may contain, for example, thirty-two address lines for aaddressing video memory 814 or main memory 815. The system bus 818 also includes, for example, a 64-bit data bus for transferring data between and among the components, such as processor 813, main memory 815, video memory 814 and mass storage 812. Alternatively, multiplex data/address lines may be used instead of separate data and address lines.

In one embodiment of the invention, the processor 813 is a SPARC™ microprocessor from Sun Microsystems™, Inc., or a microprocessor manufactured by Motorola, such as the 680X0 processor or a microprocessor manufactured by Intel, such as the 80X86, or Pentium processor. However, any other suitable microprocessor or microcomputer may be utilized. Main memory 815 is comprised of dynamic random access memory (DRAM). Video memory 814 acts as the frame buffer, and is a dual-ported video random access memory. One port of the video memory 814 is coupled to video amplifier 816. The video amplifier 816 is used to drive the cathode ray tube (CRT) raster monitor 817. Video amplifier 816 is well known in the art and may be implemented by any suitable apparatus. This circuitry converts pixel data stored in video memory 814 to a raster signal suitable for use by monitor 817. Monitor 817 is a type of monitor suitable for displaying graphic images. Alternatively, the video memory could be used to drive a flat panel or liquid crystal display (LCD), or any other suitable data presentation device.

Computer 800 may also include a communication interface 820 coupled to bus 818. Communication interface 820 provides a two-way data communication coupling via a network link 821 to a local network 822. For example, if communication interface 820 is an integrated services digital network (ISDN) card or a modem, communication interface 820 provides a data communication connection to the corresponding type of telephone line, which comprises part of network link 821. If communication interface 820 is a local area network (LAN) card, communication interface 820 provides a data communication connection via network link 821 to a compatible LAN. Communication interface 820 could also be a cable modem or wireless interface. In any such implementation, communication interface 820 sends and receives electrical, electromagnetic or optical signals which carry digital data streams representing various types of information.

Network link 821 typically provides data communication through one or more networks to other data devices. For example, network link 821 may provide a connection through local network 822 to local server computer 823 or to data equipment operated by an Internet Service Provider (ISP) 824. ISP 824 in turn provides data communication services through the world wide packet data communication network now commonly referred to as the "Internet" 825. Local network 822 and Internet 825 both use electrical, electromagnetic or optical signals which carry digital data streams. The signals through the various networks and the signals on network link 821 and through communication interface 820, which carry the digital data to and from computer 800, are exemplary forms of carrier waves transporting the information.

Computer 800 can send messages and receive data, including program code, through the network(s), network link 821, and communication interface 820. In the Internet example, remote server computer 826 might transmit a requested code for an application program through Internet 825, ISP 824, local network 822 and communication interface 820.

The received code may be executed by processor 813 as it is received, and/or stored in mass storage 812, or other non-volatile storage for later execution. In this manner, computer 800 may obtain application code in the form of a carrier wave.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

Human Interface Device Computer System

The invention has application to computer systems where the data is provided through a network. The network can be a local area network, a wide area network, the internet, world wide web, or any other suitable network configuration. One embodiment of the invention is used in a computer system configuration referred to herein as a human interface device computer system.

Figure 9:
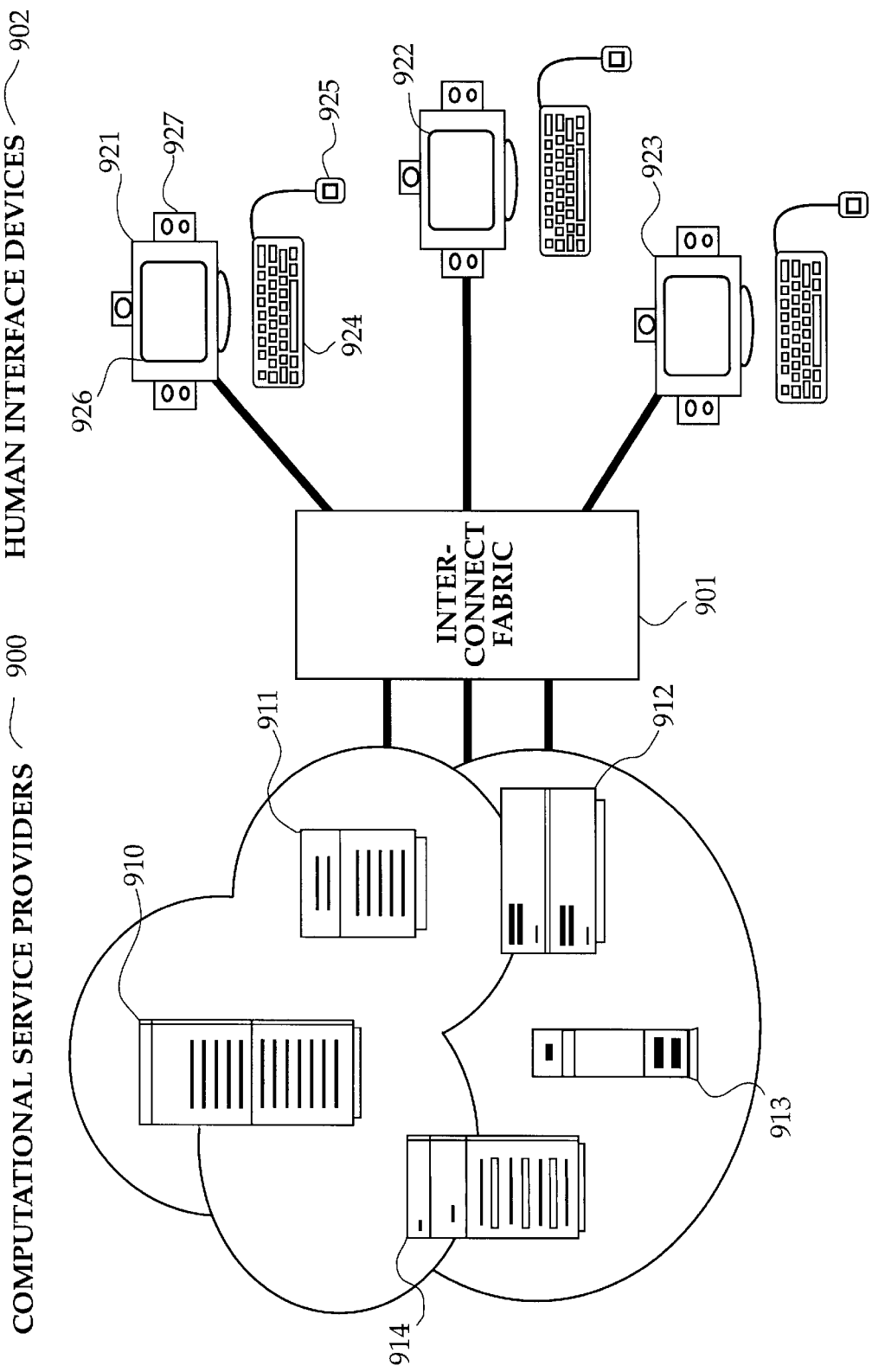
FIG. 9 is a block diagram of a human interface device computer system.

In this system the functionality of the system is partitioned between a display and input device, and data sources or services. The display and input device is a human interface device (HID). The partitioning of this system is such that state and computation functions have been removed from the HID and reside on data sources or services. In one embodiment of the invention, one or more services communicate with one or more HIDs through some interconnect fabric, such as a network. An example of such a system is illustrated in FIG. 9. Referring to FIG. 9, the system consists of computational service providers 900 communicating data through interconnect fabric 901 to HIDs 902.

Computational Service Providers—In the HID system, the computational power and state maintenance is found in the service providers, or services. The services are not tied to a specific computer, but may be distributed over one or more traditional desktop systems such as described in connection with FIG. 8, or with traditional servers. One computer may have one or more services, or a service may be implemented by one or more computers. The service provides computation, state, and data to the HIDs and the service is under the control of a common authority or manager. In FIG. 9, the services are found on computers 910, 911, 912, 913, and 914. In an embodiment of the invention, any of computers 910–914 could be implemented as a transmitter.

Examples of services include X11/Unix services, archived video services, Windows NT service, Java™ program execution service, and others. A service herein is a process that provides output data and responds to user requests and input.

Interconnection Fabric—The interconnection fabric is any of multiple suitable communication paths for carrying data between the services and the HIDs. In one embodiment the interconnect fabric is a local area network implemented as an Ethernet network. Any other local network may also be utilized. The invention also contemplates the use of wide area networks, the internet, the world wide web, and others. The interconnect fabric may be implemented with a physical medium such as a wire or fiber optic cable, or it may be implemented in a wireless environment.

HIDs—The HID is the means by which users access the computational services provided by the services. FIG. 9 illustrates HIDs 921, 922, and 923. A HID consists of a display 926, a keyboard 924, mouse 925, and audio speakers 927. The HID includes the electronics need to interface these devices to the interconnection fabric and to transmit to and receive data from the services. In an embodiment of the invention, an HID is implemented as a receiver.

Figure 10:
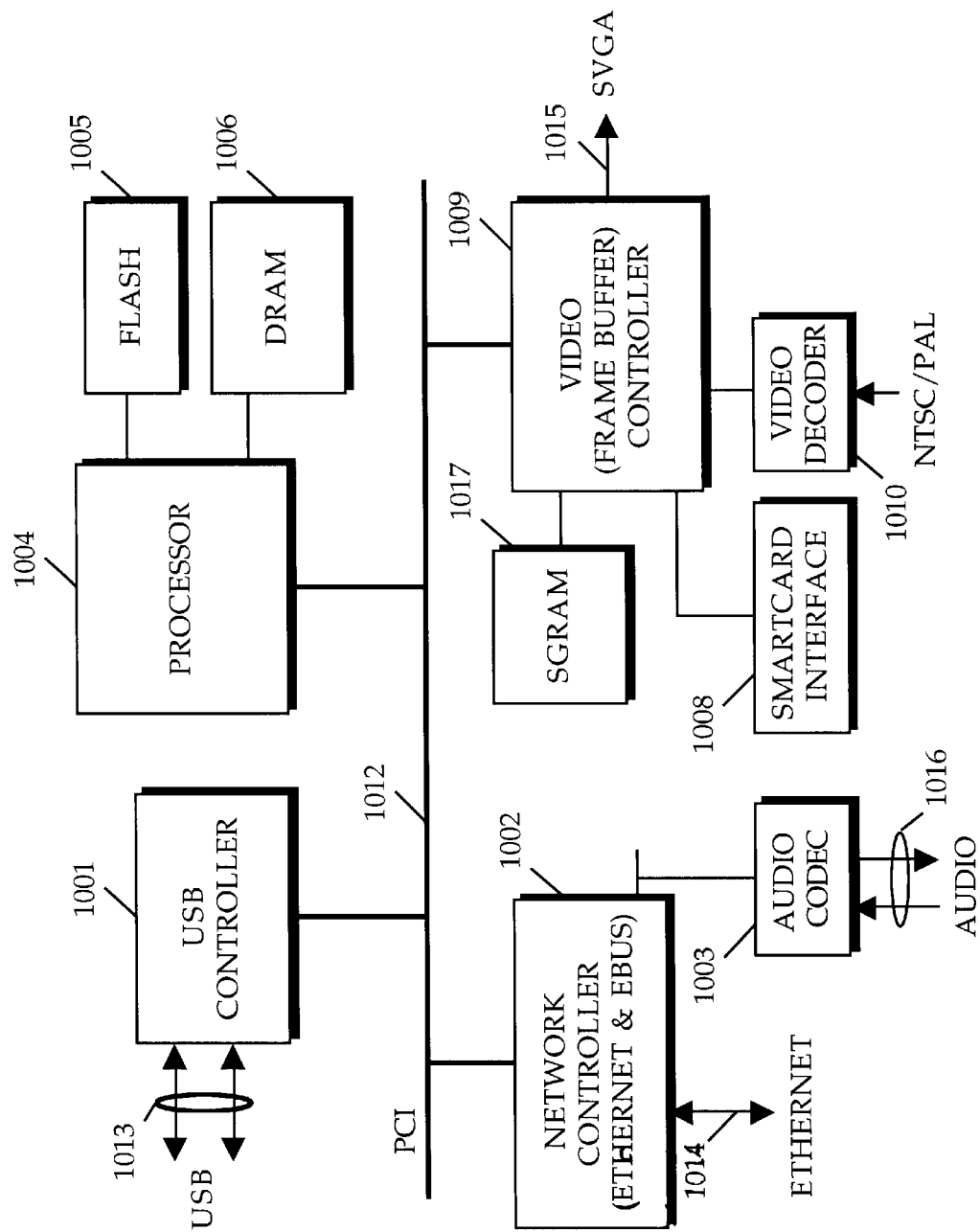
FIG. 10 is a block diagram of an embodiment of a human interface device.

A block diagram of the HID is illustrated in FIG. 10. The components of the HID are coupled internally to a PCI bus 1012. A network control block 1002 communicates to the interconnect fabric, such as an ethernet, through line 1014. An audio codec 1003 receives audio data on interface 1016 and is coupled to block 1002. USB data communication is provided on lines 1013 to USB controller 1001.

The USB controller 1001, network controller 1002 and an embedded processor 1004 are all coupled to the PCI bus 1012. Embedded processor 1004 may be, for example, a Sparc2ep with coupled flash memory 1005 and DRAM 1006. Also coupled to PCI bus 1012 is the video controller 1009 that provides SVGA output on line 1015. The video controller 1009 may be, for example, an ATI RAGE128 frame buffer controller with coupled SGRAM 1017. NTSC or PAL data is provided into the video controller through video decoder 1010. A smartcard interface 1008 may also be coupled to the video controller 1009.

The computer systems described above are for purposes of example only. An embodiment of the invention may be implemented in any type of computer system or programming or processing environment.

Thus, a method and apparatus for providing distributed clip-list management have been described in conjunction with one or more specific embodiments. The invention is defined by the claims and their full scope of equivalents.

What is claimed is:

1. An apparatus comprising:
    a frame buffer;
    at least one application coupled to said frame buffer across a network, said application comprising a first clip-list associated with said frame buffer; and
    a clip manager coupled to said frame buffer and said application, said clip manager configured to notify said application of changes to said first clip-list;
    wherein said first clip-list comprises:
        a first list comprising zero or more clip regions controlled by said application; and
        a second list comprising zero or more disputed clip regions associated with said application.

2. An apparatus comprising:
    a frame buffer;
    at least one application coupled to said frame buffer across a network, said application comprising a first clip-list associated with said frame buffer; and
    a clip manager coupled to said frame buffer and said application, said clip manager configured to notify said application of changes to said first clip-list;
    wherein said application is configured to notify said clip manager when said application claims a clip region; and
    wherein said clip manager comprises a second clip-list, said second clip-list comprising:
        a third list comprising zero or more controlled clip regions associated with said application;
        a fourth list comprising zero or more clip regions for which said clip manager awaits an acknowledgment from said application; and
        a fifth list comprising zero or more disputed clip regions.

3. The apparatus of claim 2, wherein said clip manager is configured to notify said application of changes in said second clip-list that are associated with said application.

4. An apparatus comprising:
    a frame buffer;
    at least one application coupled to said frame buffer across a network, said application comprising a first clip-list associated with said frame buffer;
    a clip manager coupled to said frame buffer and said application, said clip manager configured to notify said application of changes to said first clip-list; and
    a policing process coupled to said clip manager, said policing process configured to monitor write requests sent from said application to said frame buffer.

5. The apparatus of claim 4, wherein said policing process is configured to deny a write request from said application when said write request is directed at a clip region controlled by another application.

6. The apparatus of claim 5, wherein said policing mechanism comprises a second clip-list that is updated by said clip manager.

7. The apparatus of claim 4, wherein said application has lock-free access to undisputed clip regions of said frame buffer which are controlled by said application.

8. An apparatus comprising:
    a frame buffer;
    at least one application coupled to said frame buffer across a network, said application comprising a first clip-list associated with said frame buffer; and
    a clip manager coupled to said frame buffer and said application, said clip manager configured to notify said application of changes to said first clip-list;
    wherein said at least one application comprises a session leader, and wherein said clip manager is configured to assign unclaimed clip regions to said session leader.

9. An apparatus comprising:

a frame buffer;

at least one application coupled to said frame buffer across a network, said application comprising a first clip-list associated with said frame buffer; and a clip manager coupled to said frame buffer and said application, said clip manager configured to notify said application of changes to said first clip-list;

wherein said application is configured to send an acknowledgment to said clip manager in response to a change notification.

10. The apparatus of claim 9, wherein said acknowledgment comprises an identifier associated with said change notification.

11. A method for providing distributed clip-list management in a computer network, comprising:

a clip manager managing a global clip-list associated with a frame buffer;

an application managing a local clip-list associated with said frame buffer;

said application notifying said clip manager when said application claims a clip region;

said clip manager notifying said application of changes made to said global clip-list that are associated with said application; and said application updating said local clip-list in response to said notification from said clip manager.

12. The method of claim 11, further comprising said application performing lock-free write operations to undisputed clip regions of said frame buffer based on said local clip-list.

13. The method of claim 11, further comprising a policing mechanism monitoring frame buffer write operations.

14. The method of claim 13, further comprising said policing mechanism denying a write operation to a clip region not controlled by a writing application.

15. The method of claim 14, further comprising said clip manager notifying said policing mechanism of changes made to said global clip-list.

16. The method of claim 11, further comprising said clip manager assigning one or more unclaimed clip regions to a session leader application.

17. The method of claim 11, wherein notifying said application of changes made to said global clip-list comprises:

notifying said application of clip regions controlled by said application; and notifying said application of clip regions that are in dispute.

18. The method of claim 11, further comprising said application sending an acknowledgment to said clip manager when said clip manager notifies said application of changes.

19. The method of claim 18, wherein sending an acknowledgment comprises sending an identifier associated with a change notification.

20. A computer program product comprising:

a computer usable medium having computer readable code embodied therein for providing distributed clip-list management, said computer program product comprising:

computer readable code configured to cause a clip manager to manage a global clip-list associated with a frame buffer;

computer readable code configured to cause an application to manage a local clip-list associated with said frame buffer;

computer readable code configured to cause said application to notify said clip manager when said application claims a clip region;

computer readable code configured to cause said clip manager to notify said application of changes made to said global clip-list that are associated with said application; and computer readable code configured to cause said application to update said local clip-list in response to said notification from said clip manager.

21. The computer program product of claim 20, further comprising computer readable code configured to cause said application to perform lock-free write operations to undisputed clip regions of said frame buffer based on said local clip-list.

22. The computer program product of claim 20, further comprising computer readable code configured to cause a policing mechanism to monitor frame buffer write operations.

23. The computer program product of claim 22, further comprising computer readable code configured to cause said policing mechanism to deny a write operation to a clip region not controlled by a writing application.

24. The computer program product of claim 23, further comprising computer readable code configured to cause said clip manager to notify said policing mechanism of changes made to said global clip-list.

25. The computer program product of claim 20, further comprising computer readable code configured to cause said clip manager to assign one or more unclaimed clip regions to a session leader application.

26. The computer program product of claim 20, wherein said computer readable code configured to cause said clip manager to notify said application of changes made to said global clip-list comprises:

computer readable code configured to cause said clip manager to notify said application of clip regions controlled by said application; and computer readable code configured to cause said clip manager to notify said application of clip regions that are in dispute.

27. The computer program product of claim 20, further comprising computer readable code configured to cause said application to send an acknowledgment to said clip manager when said clip manager notifies said application of changes.

28. The computer program product of claim 27, wherein said computer readable code configured to cause said application to send an acknowledgment comprises computer readable code configured to cause said application to send an identifier associated with a change notification.

29. An apparatus comprising:

means for managing a global clip-list associated with a frame buffer;

an application managing a local clip-list associated with said frame buffer;

said application notifying said means for managing said global clip-list when said application claims a clip region;

means for notifying said application of changes made to said global clip-list that are associated with said application; and said application updating said local clip-list in response to said notification from said means for notifying.

* * * * *